United States Patent [19]

Tatsuno et al.

[11] Patent Number: 4,970,385
[45] Date of Patent: Nov. 13, 1990

[54] TEMPERATURE MEASURING DEVICE UTILIZING BIREFRINGENCE IN PHOTOELECTRIC ELEMENT

[75] Inventors: Kyoichi Tatsuno, Yamato; Ikuo Watanabe, Yokohama, both of Japan

[73] Assignee: Kabushiki Kaisha Toshiba, Kawasaki, Japan

[21] Appl. No.: 360,882

[22] PCT Filed: Sep. 9, 1988

[86] PCT No.: PCT/JP88/00908
§ 371 Date: May 11, 1989
§ 102(e) Date: May 11, 1989

[87] PCT Pub. No.: WO89/02586
PCT Pub. Date: Mar. 23, 1989

[30] Foreign Application Priority Data

Sep. 11, 1987 [JP] Japan .................. 62-227837
Aug. 29, 1988 [JP] Japan .................. 63-214115

[51] Int. Cl.$^5$ .................. G02F 1/01; H01J 40/14; G01K 11/00
[52] U.S. Cl. .................. 250/225; 250/227.17; 250/231.10; 374/161
[58] Field of Search .................. 250/227, 225, 231 P, 250/231 R, 227.17, 231.19, 231.10; 350/371, 373; 73/705; 356/365; 374/161

[56] References Cited

U.S. PATENT DOCUMENTS

| | | | |
|---|---|---|---|
| 3,950,987 | 4/1976 | Slezinger et al. | 250/225 |
| 4,140,393 | 2/1979 | Cetas | 374/161 |
| 4,179,189 | 12/1979 | Kaminow et al. | 350/371 |
| 4,296,318 | 10/1981 | Mezzetti et al. | 374/161 |
| 4,612,810 | 9/1986 | Martens | 250/225 |
| 4,712,004 | 12/1987 | Spillman, Jr. | 250/227 |
| 4,756,627 | 7/1988 | Nelson | 374/161 |
| 4,777,358 | 10/1988 | Nelson | 250/225 |

FOREIGN PATENT DOCUMENTS 0883672 11/1981 U.S.S.R. .................. 374/161

OTHER PUBLICATIONS

Optics Letters; W. Eickhoff; 1981 (Jan. 15), vol. 6, No. 4, p. 204, "Temperature Sensing by Mode-Made Inference in Birefringent Optical Fibers".

Primary Examiner—David C. Nelms
Assistant Examiner—Michael Messinger
Attorney, Agent, or Firm—Oblon, Spivak, McClelland, Maier & Neustadt

[57] ABSTRACT

A temperature measuring device intended to use the photoelastic effect of a transparent element. The present invention employs as the temperature sensing element a thermal expansion photoelastic cell comprising a photoelastic element and a stress generating element which are closely contacted with each other for yielding stress of anisotropy in the photoelastic element, which changes in response to changing ambient temperature, as the stress generating element is quite remarkably different in thermal expansion coefficient from the photoelastic element. An element is further provided to detect phase difference between two orthogonal light components passed through the photoelastic element which are one polarized component in a stress direction and the other component polarized in a direction perpendicular to the above stress direction when linearly polarized light is passed through the photoelastic element of the thermal expansion photoelastic cell. The detected phase difference is converted into a temperature, which is then displayed on a display device.

3 Claims, 5 Drawing Sheets

TEMPERATURE MEASURING DEVICE UTILIZING BIREFRINGENCE IN PHOTOELECTRIC ELEMENT

FIELD OF THE INVENTION

The present invention relates to an optical temperature measuring device and more particularly, a temperature measuring device capable of measuring temperature by using photoelastic effect.

PRIOR ART

Various temperature measuring devices have been well known. The most popular one uses a thermocouple as its sensor. The temperature measuring device using a thermocouple is used in those cases where temperature at a remote place must be measured. The thermocouple is low in cost and easy to handle, and moreover can make high accuracy temperature measurements. It is, however, interfered by electromagnetic wave because thermoelectro-motive force generated between two different metals is very small. Therefore, the temperature measuring device which uses the thermocouple cannot be used in high electric or magnetic fields, for example.

The conventional temperature measuring device which can be used in high electric or magnetic fields measure temperature by using a change of an energy gap of a semiconductor. If the energy gap changes, the edge of the absorption spectrum changes. This change can be detected as the change of transmission of LE light which has peak spectrum near the edge of the absorption spectrum. This temperature measuring device uses light as signals transmission media. This temperature measuring device can be used in high electric or magnetic fields. However, the temperature measuring device is extremely low in sensitivity because the change of the energy gap of the semiconductor depending on temperature is small. It is therefore impossible for this temperature measuring device to measure a slight change of temperature.

As described above, the conventional optical temperature measuring devices could not measure temperature with high accuracy because they were low in temperature sensitivity.

SUMMARY OF THE INVENTION

The object of the present invention is therefore to provide an optical temperature measuring device which is simple in construction and capable of measuring temperature with high accuracy even in high electric or magnetic field.

A temperature measuring device according to the present invention comprises a thermal expansion photoelastic cell including a photoelastic element and a stress generating means which are closely contacted with each other for yielding anisotropic stress in a photoelastic element in response to ambient temperature because the stress generating means is quite different in thermal expansion coefficient from the photoelastic element; a means for making linearly polarized light which is entered into the photoelastic element of the thermal expansion photoelastic cell; a means for detecting phase difference between two polarized light components passed through the photoelastic element, which are, for example, one component polarized in a stress direction or largest stress direction, and the other one polarized in a direction perpendicular to the above stress direction thereof; and a means for converting the detected phase difference into a temperature and displaying the converted temperature.

When the temperature measuring device is arranged as described above, stress in the photoelastic element changes according to changing ambient temperature. Stress thus generated in the photoelastic element also changes accordingly. This stress has anisotropy. When anisotropic stress is yielded in the photoelastic element, the photoelastic element has birefringence (or anisotropy of refraction) depending upon the stress. The degree of this birefringence in the photoelastic element can be detected phase difference between two orthogonal polarized components passed through the photoelastic element, which are one component polarized in a stress direction or largest stress direction thereof and the other component polarized in a direction perpendicular to the stress direction thereof. The system for detecting this phase difference may be wellknown. When materials of the photoelastic element and the stress generating means are selected in such a way that large thermal stress is yielded in the photoelastic element in response to changing ambient temperature, temperature detecting sensitivity can be easily enhanced. This enables the temperature measuring device of the present invention to measure temperature over a range of from $-20°$ C. to 70° C. with higher accuracy, as compared with the conventional temperature measuring device using change of energy gap of the semiconductor depending upon ambient temperature.

BEST MODE FOR EMBODYING THE INVENTION

The present invention will be described in detail with reference to the accompanying drawings.

Figure 1:
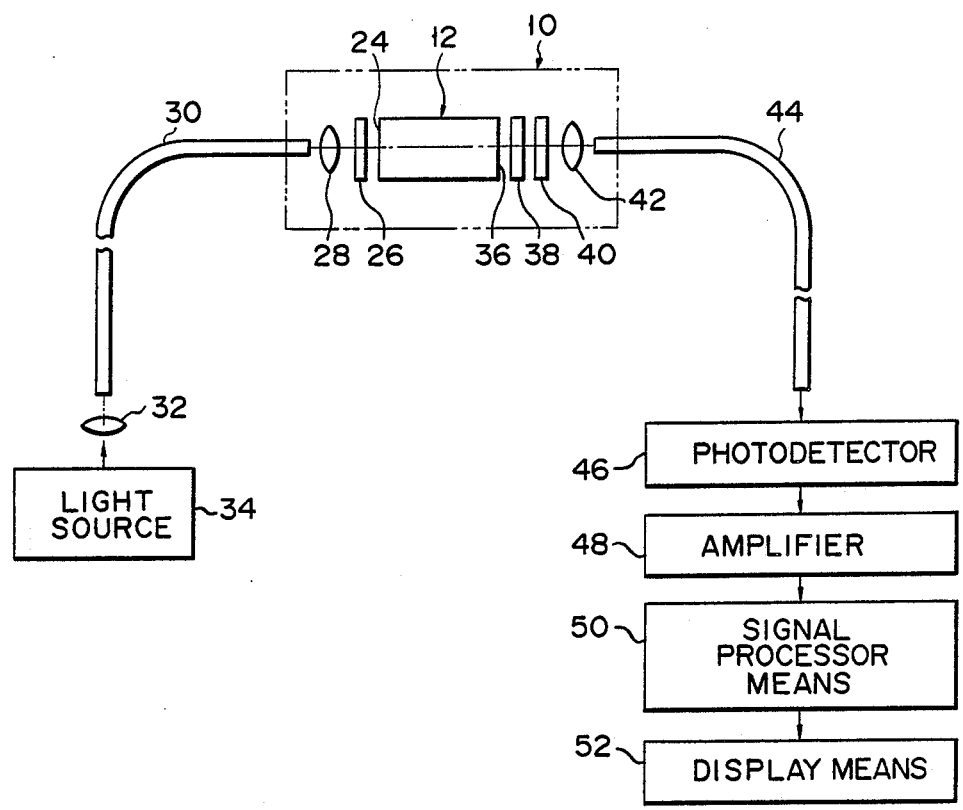
FIG. 1 shows the arrangement of an example of the temperature measuring device according to the present invention.

FIG. 1 shows the arrangement of an example of the temperature measuring device according to the present invention.

Numeral 10 represents a sensor system located at the temperature measuring point and this sensor system 10 includes thermal expansion photoelastic cell 12.

Figure 2:
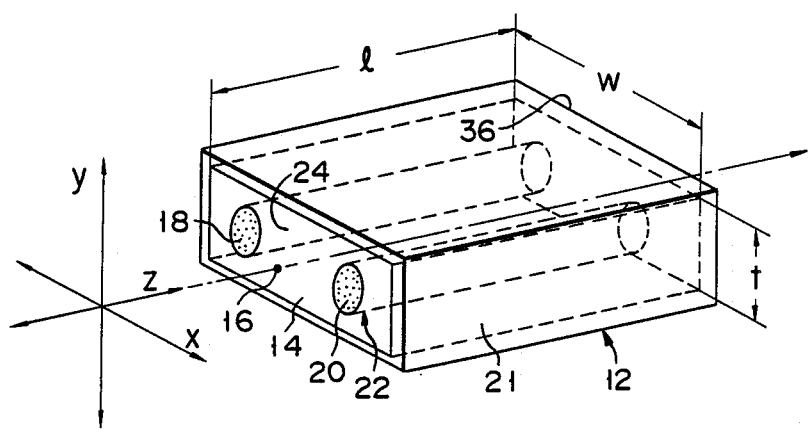
FIG. 2 is a perspective view showing a thermal expansion photoelastic cell incorporated into the temperature measuring device.

As shown in FIG. 2, thermal expansion photoelastic cell 12 comprises photoelastic element 14 made of a silica glass plate having length (l) of 10 mm, width (w) of 7 mm and thickness (t) of 4 mm, for example, filler members 18 and 20 embedded symmetrical and parallel relative to center line 16 in photoelastic element 14, and rectangular sleeve 21 closely fitted onto photoelastic element 14. Filler members 18 and 20 are made of epoxy resin and each of them fills a through-hole formed in photoelastic element 14 and having a diameter of 1.5 mm, for example. The thermal expansion coefficient of epoxy resin of filler members 18 and 20 is about 150 times as large as that of silica glass of photoelastic element 14. When the ambient temperature rises at the area where thermal expansion photoelastic cell 12 is located, both of photoelastic element 14 and filler members 18, 20 are thermally expanded. However, photoelastic element 14 is quite remarkably different in thermal expansion coefficient from filler members 18 and 20. Photoelastic element 14 is forced in rectangular sleeve 21. Therefore, stress at that portion of photoelastic element 14 which is between filler members 18 and 20 becomes larger in a direction of axis (x) than in another direction of axis (y) in Cartesiain coordinates shown in FIG. 2. In other words, filler members 18 and 20 work as stress generating means 22 yielding stress anisotropy in photoelastic element 14 according to ambient temperature because filler members 18 and 20 are quite remarkably different in thermal expansion from photoelastic element 14.

Polarizer 26 is located facing one end face 24 of photoelastic element 14 when viewed in the length direction of photoelastic element 14. The polarizing plane of this polarizer 26 is tilted at the angle 45 degrees relative to axis (x) of Cartesiain coordinates shown in FIG. 2. Lens 28 whose optical axis is in line with axis (z) of the Cartesiain coordinates is located outside polarizer 26. One end of optical fiber 30 is located outside lens 28 while the other end thereof remote from the temperature measuring point is optically connected to light source 34 (for example an LED) through lens 32.

¼ wave plate 38, analyzer 40 and lens 42 are located on the same optical axis, facing other end face 36 of photoelastic effect element 14. ¼ wave plate 38 holds one of its main axes parallel to axis (x) of Cartesiain coordinates shown in FIG. 2. The polarizing plane of analyzer 40 is perpendicular to that of polarizer 26. One end of optical fiber 44 is located outside lens 42 while the other end thereof remote from the temperature measuring point is optically connected to photodetector 46 which is, for example, a photodiode. Outputs of photodetector 46 are amplified by amplifier 48 and then applied to signal processor means 50, which calculates the ambient temperature at the area where sensor system 10 is located as will be described later. The ambient temperature thus calculated is displayed on display means 52. Sensor system 10 is roughly shown in FIG. 1, but it is actually arranged that the above-mentioned components are located as described above and fixed on a substrate by a bonding agent, keeping only the outer faces of thermal expansion photoelastic cell 12 exposed but the other components shielded by cover.

As already described above, photoelastic element 14 which works as thermal expansion photoelastic cell 12 is quite remarkably different in thermal expansion coefficient from filler members 18 and 20 embedded in photoelastic element 14. When the ambient temperature rises, therefore, stress at that portion of photoelastic element 14 which is between filler members 18 and 20 becomes larger in the direction of axis (x) than in the direction of axis (y). This stress corresponds to the ambient temperature. When this anisotropy of stress is caused in photoelastic element 14 made of silica glass, element 14 comes to have birefringence or anisotropy of refractive index.

When light of a certain intensity is sent from light source 34, it enters into optical fiber 30 through lens 32 and optical fiber 30 guides it to sensor system 10 located at the temperature measuring section. The light coming out of optical fiber 30 is converted by lens 28 into parallel beams, which enter into polarizer 26. Polarizer 26 emits linearly polarized light which includes polarized components tilted at the angle 45 degrees relative to the direction in which the stress of photoelastic element 14 becomes the largest. This light passes through photoelastic element 14 and comes out of the other end face of the element 14. Phase difference $\phi$ between the two orthogonal components of the light passing through photoelastic element 14 which are polarized component in the direction of axis (x) and polarized one in the direction of axis (y) is yielded by the birefringence of photoelastic element 14 which corresponds to the ambient temperature. This phase difference $\phi$ is represented by $$\phi = 2\pi l(nx - ny)/\lambda \qquad (1)$$

where the refractive index of the light polarized in the direction of axis (x) is nx, the refractive index of light polarized in the direction of axis (y) is ny, the wavelength of light is $\lambda$, and the length of photoelastic element 14 in the direction in which light passes through element 14 is l.

Since nx and ny change according to the ambient temperature, phase difference $\phi$ changes according to the ambient temperature, too.

The light which has passed through photoelastic element 14 then passes through analyzer 40, whose polarizing plane is arranged perpendicular to that of polarizer 26, and comes to photodetector 46 through lens 42 and optical fiber 44. Intensity (I) of the light can be expressed as follows:

$$I \propto I_O(1 - \cos 2\phi)2 \qquad (2)$$

wherein $I_O$ represents the intensity of light emitted through polarizer 26. When the relation of phase difference $\phi$ relative to the ambient temperature is previously known, the ambient temperature can be obtained from the measured light intensity I. In the case of this embodiment of the present invention, ¼ wave plate 38 is interposed to make (I) proportional to $\phi$. Therefore, the light intensity is expressed as $$I \propto I_O(1 + \sin 2\phi)/2 \qquad (3)$$

At that range where phase difference $\phi$ is small, I is proportional to $\phi$.

Outputs of photodetector 46 are amplified by amplifier 48 and then applied to signal processor means 50. Signal processor means 50 calculates the ambient temperature using a previously obtained input/temperature calibration table and this calculated temperature value is displayed on display means 52. Ambient temperature (T) can be thus monitored immediately.

Sensor system 10 for measuring temperature are composed of only optical ones in this case. Even when sensor system 10 is located in a high electric or magnetic field, therefore, it can measure temperature without being interfered with by the high electric or magnetic field. In addition, detection sensitivity can be easily enhanced only by selecting the material of stress generating means 22. Because stress generating means 22 can yield anisotropic stress in photoelastic element 14 corresponding to the ambient temperature when the material of means 22 is quite remarkably different in thermal expansion from photoelastic element 14.

Figure 3:
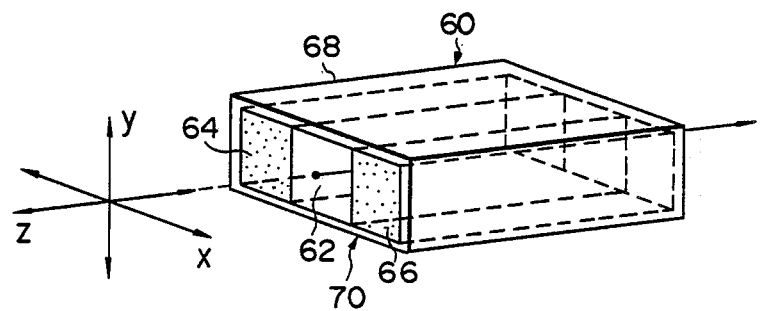
FIGS. 3 through 5 are perspective views showing variations of the thermal expansion photoelastic cell.

FIG. 3 shows a variation of the thermal expansion photoelastic cell. Thermal expansion photoelastic cell 60 comprises photoelastic element 62 which is made of silica glass and shaped like a rectangular pole, two members 64 and 66 each which are made of epoxy resin and shaped like a rectangular pole, and rectangular sleeve-like frame 68 made of a material of which thermal expansion coefficient is smaller than that of silica glass of photoelastic element 62, wherein two members 64 and 66 which sandwich photoelastic element 62 between them are closely fitted into frame 68.

With thermal expansion photoelastic cell 60 arranged as described above, anisotropic stress is generated in photoelastic effect element 62 responsive to ambient temperature because of the difference of thermal expansion coefficient between photoelastic element 62 and members 64, 66. The thermal expansion coefficient of epoxy resin is larger than that of silica glass. Larger stress in the direction of axis (x) can be generated than that in the direction of axis (y) in this case in photoelastic element 62, corresponding to changing ambient temperature. Frame 68 and members 64, 66 work as stress generating means 70 in this case. Thermal expansion photoelastic cell 60 can be used instead of thermal expansion photoelastic cell 12 shown in FIG. 1.

Figure 4:
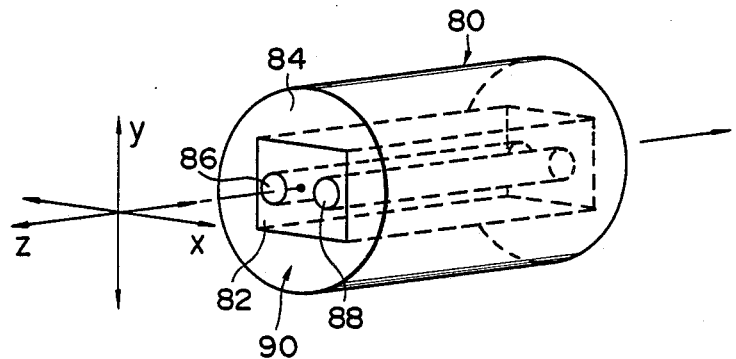

FIG. 4 shows a further variation of the thermal expansion photoelastic cell. Thermal expansion photoelastic cell 80 comprises photoelastic element 82 made of Pyrex glass or polycarbonate shaped a rectangular pole, outer member 84 which is made of Invar alloy and is contact at 4 side faces with photoelastic element 82, and through-holes 86 and 88 which is symmetrical and parallel to axis (z) in photoelastic element 82.

The thermal expansion coefficient of Pyrex glass or polycarbonate is larger than that of Invar alloy. In addition, through-holes 86 and 88 are made on axis (x) in this case. With this thermal expansion photoelastic cell 80, therefore, stress in the direction of axis (y) in photoelastic element 82 can be generated larger than that in the direction of axis (x), corresponding to changing ambient temperature. Outer member 84 and through-holes 86, 88 work as stress generating means 90 in this case.

Figure 5:
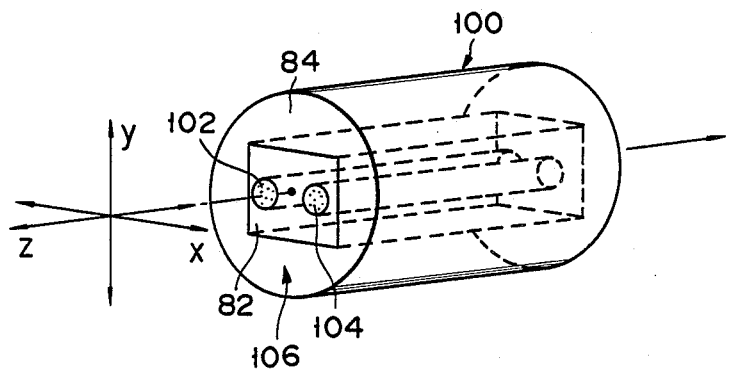

FIG. 5 shows a still further variation of the thermal expansion photoelastic cell. This thermal expansion photoelastic cell 100 is a variation of thermal expansion photoelastic cell 80 shown in FIG. 4. In the case of this variation, therefore, through-holes in photoelastic element 82 are filled with inner members 102 and 104 which are made of a material with a larger thermal expansion coefficient than that of the material of photoelastic element 82.

Figure 6:
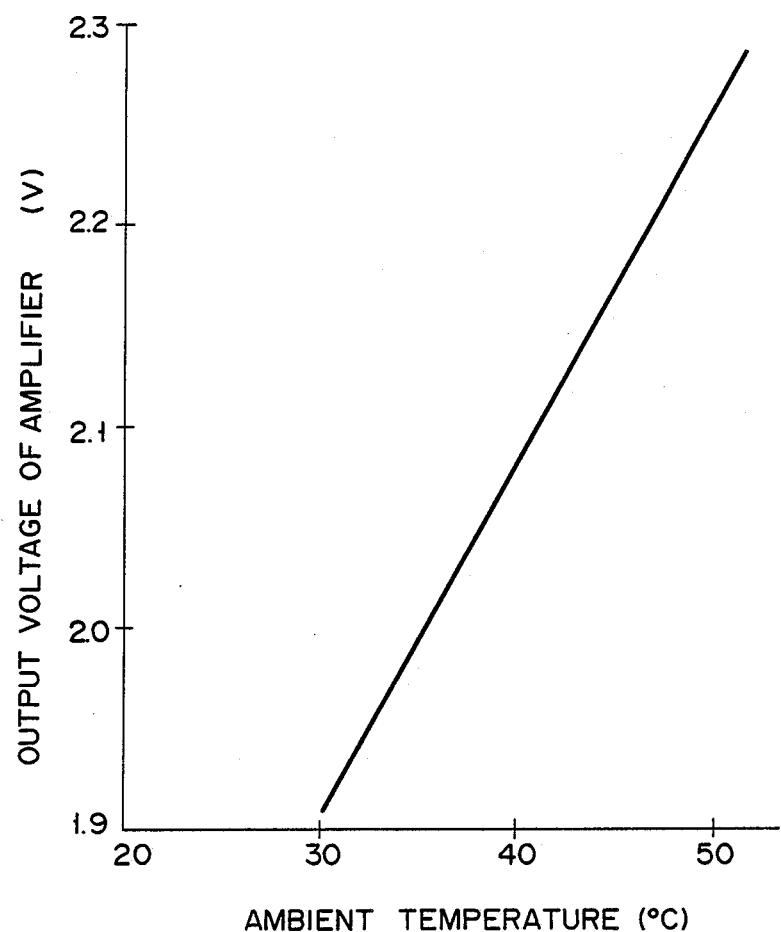
FIG. 6 shows the relation of the output of an amplifier relative to changing ambient temperature when the thermal expansion photoelastic cell shown in FIG. 5 is used.

With thermal expansion photoelastic cell 100, therefore, stress in the direction of axis (x) in photoelastic effect element 82 can be generated become larger than that in the direction of axis (y) responding to changing ambient temperature, so that temperature detecting sensitivity can be enhanced. Outer and inner members 84, 102 and 104 work as stress generating means 106 in this case. FIG. 6 shows the relation of ambient temperature and the output of amplifier 48 when thermal expansion photoelastic cell 100 is used instead of thermal expansion photoelastic cell 12 shown in FIG. 1. As apparent from FIG. 6, the output of amplifier 48 changes almost linearly when ambient temperature changes.

Figure 7:
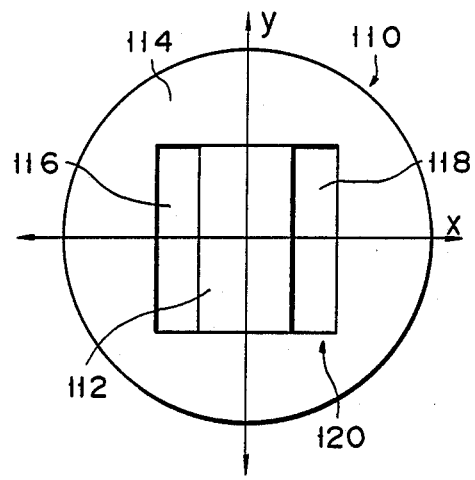
FIGS. 7 through 11 show further variations of the thermal expansion photoelastic cell when viewed in the direction of input light beam.

FIG. 7 shows a light incident end face of thermal expansion photoelastic cell 110 which is a still further variation according to the present invention. Thermal expansion photoelastic cell 110 comprises photoelastic element 112 made of Pyrex glass or polycarbonate, outer member 114 which is made of Invar alloy and is contact at 4 side faces with photoelastic element 112, and inner members 116, 118 which are made of a material with a thermal expansion coefficient larger than that of the material of photoelastic element 112, and which are located on both sides of element 112 in the direction of axis (x).

When thermal expansion photoelastic cell 110 is arranged as described above, stress in the direction of axis (x) is far larger than stress in the direction of axis (y), in photoelastic element 112 in response to changing ambient temperature. Temperature detecting sensitivity can be thus enhanced. Outer and inner members 114, 116 and 118 work as stress generating means 120 in this case.

Figure 8:
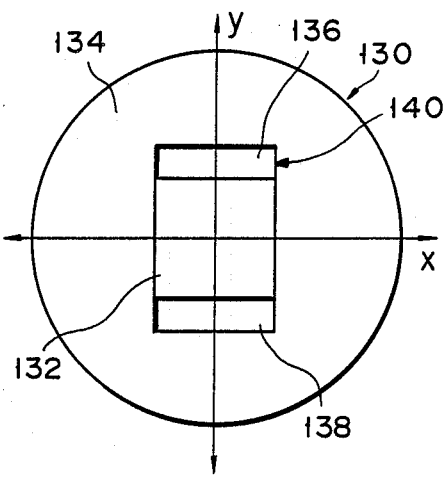

FIG. 8 shows a light incident end face of thermal expansion photoelastic cell 130 which is a still further variation according to the present invention. Thermal expansion photoelastic cell 130 comprises photoelastic element 132 which is made of Pyrex glass or polycarbonate and is shaped as a rectangular pole, and outer member 134 which is made of Invar alloy and is contact at 2 side faces with photoelastic element 132 and leaves spaces between two sides of element 132 in the direction of axis (y).

When thermal expansion photoelastic cell 130 is arranged like this, stress in the direction of axis (x) can be far larger than stress in the direction of axis (y), of those stresses which are generated in photoelastic element 132 in response to changing ambient temperature. Temperature detecting sensitivity can be thus enhanced. Outer member 134 and spaces 136, 138 which is left between both sides of element 132 in the direction of axis (y) and outer member 134 work as stress generating means 140 in this case.

Figure 9:
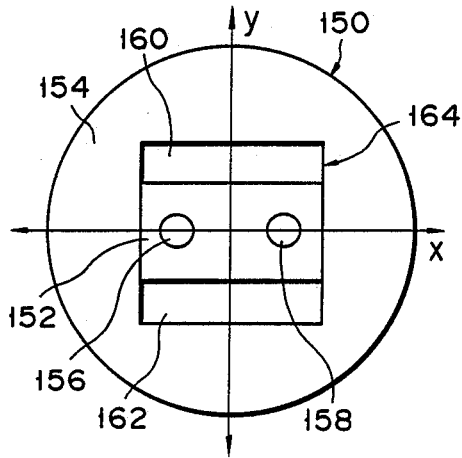

FIG. 9 shows a light incident end face of thermal expansion photoelastic cell 150 which is a still further variation according to the present invention. Thermal expansion photoelastic cell 150 comprises photoelastic element 152 which is made of Pyrex glass or polycarbonate and is shaped a rectangular pole, outer member 154 which is made of Invar alloy closely contact with photoelastic element 152 leaving both end faces of element 152 uncovered and forming spaces between both sides of element 152 in the direction of axis (y) and outer member 154, and circular through-holes 156, 158 which is made symmetrical to axis (y) and parallel to axis (z) in photoelastic effect element 152.

When thermal expansion photoelastic cell 150 is arranged like this, stress in the direction of axis (x) can be made far larger than stress in the direction of axis (y), in photoelastic element 152 in response to changing ambient temperature, thereby enabling temperature detecting sensitivity to be remarkably enhanced. In this arrangement, element 152 extended in the direction of axis (z) and through-holes 156, 158 work as stress generating means 164. Through-holes 156 and 158 may be filled with members made of a material with a thermal expansion coefficient larger than that of the material of photoelastic element 152.

Figure 10:
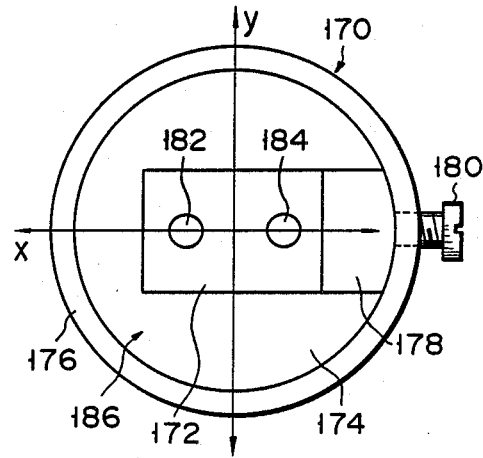

FIG. 10 shows a light incident end face of thermal expansion photoelastic cell 170 which is a still further variation according to the present invention. In this case of this thermal expansion photoelastic cell 170, photoelastic element 172 is made of Pyrex glass or polycarbonate and shaped like a rectangular pole. Outer member 174 is made of Invar alloy and encloses photoelastic element 172 of which both end faces of element 172 is uncovered. A space is left between one side of element 172 in the direction of axis (x) and outer member 174. This assembly of photoelastic element 172 and outer member 174 is closely fitted into cylindrical member 176. Auxiliary member 178 is fitted into the space between one side of element 172 in the direction of axis (x) and outer member 174 and screw 180 loads bias force to auxiliary member 178 from outside cylindrical member 176 in the direction of axis (x). Circular through-holes are made symmetrical to axis (y) and parallel to axis (z) in photoelastic effect element 172. They are filled with inner members 182 and 184 which are made of a material with a thermal expansion coefficient larger than that of the material of photoelastic element 172.

When thermal expansion photoelastic cell 170 is arranged like this, cylindrical member 176, outer member 174 and inner members 182, 184 work as stress generating means 186. Therefore, stress in the direction of axis (x) can be made larger than stress in the direction of axis (y) in photoelastic element 172 in response to changing ambient temperature. When screw 180 is adjusted to apply initial bias stress to photoelastic element 172 in the direction of axis (x), the compressive stress can be kept by the initial bias stress, even if outer member 174 shrinks in a case where the thermal expansion coefficient of inner members 182 and 184 is smaller than that of outer member 174.

Figure 11:
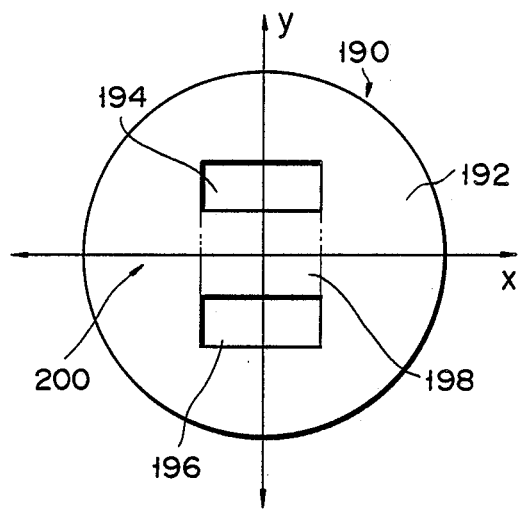

FIG. 11 shows a light incident end face of thermal expansion photoelastic cell 190 which is a still further variation according to the present invention. In the case of this thermal expansion photoelastic cell 170, column 192 is made of glass and rectangular pole-like spaces 194 and 196 are made symmetrical to axis (x) and parallel to axis (z) in column 192. That portion 198 of column 192 which is between spaces 194 and 196 is doped with Ge or B to have a thermal expansion coefficient different from that of the other portion thereof and to work as the photoelastic element. Therefore, the other portion of column 192 and portions 194, 196 thereof work as stress generating means 200.

The thermal expansion photoelastic cell can be further modified as follows: In the case of thermal expansion photoelastic cell 130 shown in FIG. 8, inner members made of a material with a thermal expansion coefficient larger than that of the material of photoelastic element 132 may be fitted into spaces between both sides of photoelastic element 132 in the direction of axis (x) and outer member 134.

The stress generating means of the above-described thermal expansion photoelastic cell are all intended to apply a compression force to the photoelastic element. In the case of thermal expansion photoelastic cell 80 shown in FIG. 4, however, a pull stress can be applied to photoelastic element 82 when outer member 84 which is made of brass with a large thermal expansion coefficient is bonded to photoelastic element 82 made of Pyrex glass. The stress generating means may work to apply pull stress to the photoelastic element in this manner. Industrial Applicability:

As apparent from the above, the temperature measuring device according to the present invention can be useful in those cases where temperature must be measured with high accuracy in high electric or magnetic fields.

I claim:

1. A temperature measuring device comprising:
a photoelastic element having a center axis;
a stress generating structure including:
    an outer member made of a material with a thermal expansion coefficient smaller than that of the material of the photoelastic element and arranged so as to closely enclose the photoelastic element; and
    a plurality of inner members made of a material with a thermal expansion coefficient larger than that of the material of the photoelastic element and arranged in the photoelastic element or between the photoelastic member and the outer member, the plurality of inner members being symmetrical to and parallel to the center axis of the photoelastic element and causing the photoelastic element to generate anisotropic stress in response to an ambient temperature;
means for providing linearly polarized light means for providing the linearly polarized light along the center axis of the photoelastic element;
means for detecting a phase difference between first and second light components of the polarized light passed through the photoelastic element, the first light component being polarized in the direction of the stress and the second light component being polarized in a different direction to the above direction of stress; and
means for converting the detected phase difference into a temperature and displaying the temperature.

2. The temperature measuring device according to claim 1, wherein said first and second light components are orthogonal light components.

3. The temperature measuring device according to claim 2, wherein said stress generating structure includes a mechanism for applying an anisotropic bias force to the photoelastic element.

* * * * *

UNITED STATES PATENT AND TRADEMARK OFFICE
CERTIFICATE OF CORRECTION

PATENT NO. : 4,970,385
DATED : NOVEMBER 13, 1990
INVENTOR(S) : KYOICHI TATSUNO ET AL.

It is certified that error appears in the above-identified patent and that said Letters Patent is hereby corrected as shown below:

ON TITLE PAGE:

In the title, please delete "PHOTOELECTRIC" and insert --PHOTOELASTIC--.

Signed and Sealed this

Thirty-first Day of March, 1992

Attest:

HARRY F. MANBECK, JR.

*Attesting Officer*     *Commissioner of Patents and Trademarks*